United States Patent
Kometani (10) Patent No.: US 9,526,936 B2
(45) Date of Patent: Dec. 27, 2016

(54) METHOD FOR HYDROTHERMAL OXIDATION TREATMENT FOR ORGANIC HALOGEN COMPOUND

(71) Applicant: OSAKA CITY UNIVERSITY, Osaka-shi, Osaka (JP)

(72) Inventor: Noritsugu Kometani, Osaka (JP)

(73) Assignee: OSAKA CITY UNIVERSITY, Osaka-shi, Osaka (JP)

(*) Notice: Subject to any disclaimer, the term of this patent is extended or adjusted under 35 U.S.C. 154(b) by 13 days.

(21) Appl. No.: 14/440,177

(22) PCT Filed: Nov. 1, 2013

(86) PCT No.: PCT/JP2013/079676
§ 371 (c)(1),
(2) Date: May 1, 2015

(87) PCT Pub. No.: WO2014/080739
PCT Pub. Date: May 30, 2014

(65) Prior Publication Data
US 2015/0283418 A1    Oct. 8, 2015

(30) Foreign Application Priority Data

Nov. 20, 2012 (JP) ................... 2012-254011

(51) Int. Cl.
| | | |
|---|---|---|
| *A62D 3/35* | (2007.01) | |
| *A62D 3/34* | (2007.01) | |
| *B01J 23/72* | (2006.01) | |
| *C02F 1/72* | (2006.01) | |
| *C02F 1/02* | (2006.01) | |
| *C02F 101/36* | (2006.01) | |

(52) U.S. Cl.
CPC ................ *A62D 3/34* (2013.01); *B01J 23/72* (2013.01); *C02F 1/025* (2013.01); *C02F 1/72* (2013.01); *C02F 1/725* (2013.01); *C02F 2101/36* (2013.01); *C02F 2101/363* (2013.01); *C02F 2101/366* (2013.01); *C02F 2209/02* (2013.01); *C02F 2209/03* (2013.01); *C02F 2209/40* (2013.01); *C02F 2305/026* (2013.01)

(58) Field of Classification Search
CPC .......... A62D 3/35; A62D 3/33; A62D 101/22; A62D 3/34; B09C 1/08
USPC ....................... 588/316, 315, 406
See application file for complete search history.

(56) References Cited

U.S. PATENT DOCUMENTS

2009/0250404 A1    10/2009    Berkowitz et al.

FOREIGN PATENT DOCUMENTS

| | | |
|---|---|---|
| DE | 4118626 A1 | 12/1992 |
| JP | 05-212389 A | 8/1993 |
| JP | 11-262780 A | 9/1999 |
| JP | 2001-029969 A | 2/2001 |
| JP | 2001-232379 A | 8/2001 |
| JP | 2006-231119 A | 9/2006 |
| WO | 2012/133006 A1 | 10/2012 |

OTHER PUBLICATIONS

Notifcation of Transmittal of Translation of the International Preliminary Report on Patentability (Form PCT/IB/338) of Application No. PCT/JP2013/079676 mailed May 21, 2015with Form PCT/IPEA/409 (English translation) (4 pages).
International Search Report dated Jan. 21, 2014, issued in corresponding application No. PCT/JP2013/079676.
Savage, "Organic Chemical Reactions in Supercritical Water", Chemical Reviews, 1999, vol. 99, No. 2, pp. 603-621, cited in Specification.

*Primary Examiner* — Edward Johnson
(74) *Attorney, Agent, or Firm* — Westerman, Hattori, Daniels & Adrian, LLP (57) ABSTRACT

Provided are a treatment method for an organic halogen compound, which allows the organic halogen compound to be efficiently decomposed without a large-scale treatment device or high operating cost, and a catalyst to be used for the treatment method. In the treatment method, an organic halogen compound is subjected to decomposition treatment by heating the organic halogen compound at a temperature of from 100° C. to 200° C. in the presence of a catalyst formed of copper oxide and hydrogen peroxide, to subject the organic halogen compound to a hydrothermal oxidation reaction utilizing a Fenton method.

7 Claims, 4 Drawing Sheets

FIG. 1  SCHEMATIC VIEW OF REACTION DEVICE

FIG. 2 SCHEMATIC VIEW OF ANOTHER REACTION DEVICE

FIG. 3. Decomposition rates of chlorophenol under respective reaction temperatures and conditions FIG. 4. Changes in decomposition rate of chlorophenol and decomposition rate of TOC over time FIG. 5. Changes in decomposition rate of chlorophenol and decomposition rate of TOC over time (reaction temperature: 200°C, pressure: 10 MPa)

FIG. 6. Changes in decomposition rate of chlorophenol and decomposition rate of TOC over time (reaction temperature: 170°C, pressure: 0.9 MPa)

METHOD FOR HYDROTHERMAL OXIDATION TREATMENT FOR ORGANIC HALOGEN COMPOUND

TECHNICAL FIELD

The present invention relates to a hydrothermal oxidation treatment method for an organic halogen compound utilizing a Fenton method, and a catalyst to be used for the treatment method. More particularly, the present invention relates to a treatment method involving decomposing and detoxifying organic halogen compounds including: an organic chlorine compound such as chlorobenzene, trichloroethylene, perchloroethylene, polychlorinated biphenyl (PCB), or a dioxin; and an organic fluorine compound such as a fluorinated hydrocarbon such as tetrafluoroethane, pentafluorobutane, or chlorodifluoromethane, a fluorine-based surfactant such as a perfluoroalkyl sulfonic acid or a perfluoroalkyl carboxylic acid, or a fluorine-based lubricating oil such as perfluoropolyether or polytetrafluoroethylene, and to a catalyst to be used for the treatment method.

BACKGROUND ART

There are many kinds of organic chlorine compounds. However, various problems have been pointed out on those compounds from an environmental viewpoint or a health viewpoint, and an effective decomposition treatment method has been craved.

Waste water or wash solution to be discharged from various business facilities including a high-tech plant is often contaminated with an organic chlorine compound such as trichloroethylene or an organic fluorine compound such as a fluorine-based surfactant or a fluorine-based lubricant. There has been a concern about an environmental problem such as soil contamination or groundwater contamination caused by an organic halogen compound contained in the waste water or wash solution. Further, it has been pointed out that such organic halogen compound may cause central nervous system damage or liver dysfunction. In addition, a fluorinated hydrocarbon has been pointed out as a substance responsible for ozone layer destruction, and detoxification of such substance has also been an issue.

PCB was used as an electrical insulating oil (transformer oil) of a transformer in the past, but its use has been prohibited since its toxicity was recognized. Previously used PCB is collectively stored in a predetermined place.

PCB has partly been treated by a combustion method, but its detoxification is not always easy at present.

In addition, polychlorinated dibenzo-para-dioxins (PCDDs) and polychlorinated dibenzofurans (PCDDs) are collectively called dioxins. The dioxins are compounds each having a structure in which two benzene nuclei are bonded to each other through oxygen, and there are many kinds of dioxins in which the number of chlorines bonded to the benzene nuclei and its bonding position are different. The dioxins are compounds having toxicity generated from a garbage incinerator or the like.

CITATION LIST

Patent Literature

[PTL 1] JP 2001-29969 A
[PTL 2] JP 2006-231119 A
[PTL 3] JP 05-212389 A
[PTL 4] JP 11-262780 A

Non Patent Literature

[NPL 1] Savare P. E., Organic chemical reactions in supercritical water, Chem. Rev. 99, 603-621 (1999)

SUMMARY OF INVENTION

Technical Problem

For treatment of the waste water or wash solution contaminated with an organic halogen compound, for example, a halogenated hydrocarbon or the like, a coagulation-sedimentation and filtration treatment method, an activated carbon adsorption method, a biological decomposition treatment method, or the like, which is a relatively inexpensive treatment technology for waste water, is often used. However, the organic halogen compound cannot be completely removed by those methods.

In addition to the above-mentioned methods, a treatment method with ozone and ultraviolet light (Patent Literature 1), a hydrothermal oxidation method (Non Patent Literature 1), or the like is sometimes used. However, those methods involve expensive facilities and complicated steps, and thus high operating cost.

As a treatment method for a toxic persistent organic chlorine compound such as PCB or a dioxin, the following methods have been examined as in the case of the treatment of the waste water: a high-temperature combustion method, an activated carbon adsorption method, a radiation exposure method, a chemical treatment method using a peroxide, a photocatalytic method using titanium oxide, a supercritical water oxidation method, a hydrothermal oxidation method, a Fenton method, an ultrasonic treatment method, a microbial treatment method, or the like. However, those methods involve some problems in terms of facility cost, operating cost, the decomposition rate of the persistent organic chlorine compound, or the like, and in fact, are not always satisfactory. In addition, as described above, detoxification treatment of a fluorinated organic compound has also been an issue.

Of the above-mentioned methods, the "supercritical water oxidation method," that is, a method involving using as a reaction site water at a temperature and pressure higher than its liquid-vapor critical point (374° C., 22.1 MPa), which enables safe and rapid decomposition treatment, has attracted attention. Further, the "hydrothermal oxidation method," which is a method involving subjecting a toxic substance to oxidative decomposition by using as a reaction site water at high temperature and high pressure falling within a wide temperature and pressure range also including a temperature and pressure equal to or lower than its critical point, has attracted attention.

In addition, the "Fenton method", which is a method involving applying a Fenton reaction, in which a hydroxy radical having a high oxidative decomposition ability is generated through a reaction between an iron ion and hydrogen peroxide, to treatment of contaminated water or the like, is also a technology that has been attracted attention.

However, in order to completely decompose the organic halogen compound, a reaction temperature equal to or higher than the critical point (374° C.), which is adopted in the supercritical water oxidation method, is generally required. In consequence, a large amount of energy is consumed, and a device needs to be designed to withstand high temperature and high pressure conditions with complexity and expensive cost. The device is severely deteriorated in its use, and the lifetime of the device is considerably shortened.

In view of the foregoing, in the hydrothermal oxidation method, the following catalysts have been examined in order to reduce the reaction temperature: a catalyst in which a precious metal such as ruthenium or palladium is supported on titania or alumina; a catalyst such as platinum or zeolite (Patent Literature 2); and a catalyst in which a transition metal such as manganese, iron, cobalt, or copper is incorporated into titanium, silicon, zirconium, or cerium (Patent Literature 3). In the case of using the last catalyst, trichloroethylene is successfully removed at a rate of from 70 to 90% at a reaction temperature of 250° C.

However, the above-mentioned related art has not yet succeeded in completely decomposing the persistent organic halogen compound while the reaction temperature is reduced significantly, in particular, to 200° C. or less. The related art is not always satisfactory at present.

The fact that the reaction temperature is 200° C. or less gives an important indication for realizing simplification of the device and extension of the lifetime of the device.

Heretofore, the inventor of the present invention has succeeded in completely decomposing chlorobenzene at a reaction temperature of 200° C. by using as a catalyst tungsten trioxide or titanium dioxide doped with copper, and has already applied for a patent (Japanese Patent Application No. 2011-72548).

However, the invention of this application has a problem in that copper doped in the catalyst is gradually eluted in long-term treatment, resulting in a reduction in catalytic activity. In addition, a catalyst preparation method is complicated, and further simplification is demanded. Regarding the reaction temperature, a catalyst system enabling a decomposition reaction in a lower temperature range is demanded.

On the other hand, there has been an attempt to subject the organic halogen compound to decomposition treatment based on a Fenton method. There has been proposed a method involving subjecting the organic halogen compound to decomposition treatment based on a Fenton method by using as a catalyst zeolite supporting thereon an iron compound or copper compound (Patent Literature 4).

However, in this method, a removal rate stays at about 90% even after a long-term reaction over 3 days in Examples using as the copper compound copper(II) chloride. In view of treating effluent, waste water, or the like to be discharged in a large amount from a high-tech plant or the like, an ability to treat a target more rapidly for a shorter time period is demanded.

The present invention has been made for solving the above-mentioned problems, and an object of the present invention is to provide a hydrothermal oxidation treatment method for an organic halogen compound utilizing a Fenton method, which allows the organic halogen compound to be efficiently decomposed and detoxified without high facility cost or high operating cost, and a catalyst to be used for the treatment method.

Solution to Problem

For achieving the above-mentioned object, a decomposition treatment method for an organic halogen compound of the present invention includes using a uniquely found copper oxide catalyst in treatment based on a hydrothermal oxidation method utilizing a Fenton method. This eliminates the need for the high temperature reaction conditions, which have conventionally been essential, and hence the treatment can be performed at a significantly reduced reaction temperature. Thus, a significant reduction in energy to be consumed in the treatment, simplification of a device, and extension of the lifetime of the device are realized.

In the present invention, by using the catalyst based on copper oxide, a hydroxy radical having a high oxidative decomposition ability is generated at a reaction site through a Fenton-type reaction between a copper ion and hydrogen peroxide. With this, a hydrothermal oxidation reaction of the organic halogen compound is promoted.

By the method, the organic halogen compound can be treated at a decomposition rate of almost 100% even when the reaction temperature is reduced to 200° C. or less. In consequence, effects on simplification of the device, extension of the lifetime of the device, and the like are greatly improved as compared to those in the related art.

Further, a treatment time period is dramatically shortened (about 2 minutes) as compared to that in the case of a related-art Fenton method, and effluent or waste water can be treated in a large amount.

The point of the present invention resides in the use of copper oxide such as copper(I) oxide or copper(II) oxide as a catalyst. By using copper oxide itself as a catalyst, the catalyst preparation method was dramatically simplified, and concurrently catalytic activity was able to be maintained for a long time period.

It should be noted that, as a method of using the catalyst in the treatment, there is given a method involving suspending the catalyst directly in waste water or effluent before use and a method involving filling and fixing the catalyst in a reaction vessel. Herein, in the case of adopting the latter method, when the catalyst is heated at 650° C. for about 1 hour in an inert atmosphere to provide a porous sintered body, the catalyst can maintain well contact with a reaction substrate in the reaction vessel stably for a long time period without losing its activity.

In particular, copper(I) oxide had extremely high catalytic activity, and allowed chlorophenol to be decomposed at a rate of almost 100% even when the reaction temperature was reduced to 133° C.

In addition, it was found that chlorophenol was able to be efficiently decomposed even when the pressure in the reaction vessel was reduced to a pressure immediately above the equilibrium vapor pressure of water at the reaction temperature. This fact is described by way of a specific example. While the equilibrium vapor pressure of water was about 0.8 MPa at 170° C., chlorophenol was able to be decomposed at a rate of almost 100% at a reaction temperature of 170° C. and a pressure of 0.9 MPa.

The present invention eliminates the need for the high temperature and high pressure reaction conditions, which have conventionally been required for the decomposition treatment of the organic halogen compound. In consequence, it is expected that a significant reduction in energy to be consumed in the treatment, simplification of the device, and extension of the lifetime of the device can be realized.

It should be noted that various copper compounds other than the above-mentioned copper oxide may be used as a catalyst in a Fenton method. Examples of such copper compounds include copper nitrate, copper chloride, and copper sulfate. However, in the present invention, more preferred results are obtained by the use of copper oxide.

Specifically, according to one embodiment of the present invention, there is provided (1) a decomposition treatment method for an organic halogen compound, the method including heating an organic halogen compound at a temperature of from 100° C. to 200° C. in the presence of a catalyst formed of copper oxide and hydrogen peroxide, to subject the organic halogen compound to a hydrothermal oxidation reaction utilizing a Fenton method.

In addition, according to one embodiment of the present invention, there is provided (2) a decomposition treatment method for an organic halogen compound according to (1), in which the heating of the organic halogen compound is performed at a temperature of from 120° C. to 200° C.

In addition, according to one embodiment of the present invention, there is provided (3) a decomposition treatment method for an organic halogen compound according to (1) or (2), in which the hydrothermal oxidation reaction is performed in a reaction vessel at a pressure equal to or higher than an equilibrium vapor pressure of water at the heating temperature and near the equilibrium vapor pressure.

In addition, according to one embodiment of the present invention, there is provided (4) a decomposition treatment method for an organic halogen compound according to anyone of (1) to (3), in which the catalyst formed of copper oxide includes a catalyst formed of copper(I) oxide or/and copper(II) oxide.

Further, according to one embodiment of the present invention, there is provided (5) a decomposition treatment method for an organic halogen compound according to any one of (1) to (4), in which: the catalyst formed of copper oxide is in a form of a porous sintered body; and the hydrothermal oxidation reaction is performed in a state in which the catalyst formed of copper oxide is retained and fixed in the reaction vessel.

In addition, according to one embodiment of the present invention, there is provided (6) a catalyst for a hydrothermal oxidation reaction, which is used for the decomposition treatment method for an organic halogen compound of any one of (1) to (5), the catalyst including a catalyst formed of copper oxide.

In addition, according to one embodiment of the present invention, there is provided (7) a catalyst for a hydrothermal oxidation reaction according to (6), in which the catalyst formed of copper oxide includes a catalyst formed of copper(I) oxide or/and copper(II) oxide.

In addition, according to one embodiment of the present invention, there is provided (8) a catalyst for a hydrothermal oxidation reaction according to (6) or (7), in which the catalyst formed of copper oxide is in a form of a porous sintered body.

Advantageous Effects of Invention

According to the embodiments of the present invention, the organic halogen compound can be efficiently decomposed through short-term treatment using a simple device. The organic halogen compound can be efficiently decomposed for a shorter retention time period by performing the hydrothermal reaction treatment in the presence of the copper oxide catalyst, that is, the catalyst formed of copper (I) oxide or/and copper(II) oxide, preferably in the presence of the catalyst formed of copper(I) oxide.

DESCRIPTION OF EMBODIMENTS

In a treatment method of the present invention, water to be treated containing an organic halogen compound is introduced in a reaction vessel with a pressure pump, and further a copper oxide catalyst and hydrogen peroxide are added to the reaction vessel. Then, a hydrothermal oxidation reaction utilizing a Fenton method is continuously conducted at a pressure of from 0.1 to 50 MPa, preferably from 0.3 to 30 MPa, at a temperature of from 20 to 200° C., preferably from 100 to 200° C., more preferably from 120 to 200° C., for from 1 to 5 minutes.

When the pressure in the reaction vessel for hydrothermal oxidation is set to a pressure equal to or higher than the equilibrium vapor pressure of water at the reaction temperature, the organic halogen compound can be efficiently decomposed. In particular, from the viewpoint of simplifying the reaction device, the pressure is preferably set to a pressure immediately above the equilibrium vapor pressure, that is, a pressure equal to or higher than the equilibrium vapor pressure and near the equilibrium vapor pressure. Herein, the pressure near the equilibrium vapor pressure refers to a pressure within roughly 1 MPa from the equilibrium vapor pressure.

While the amount of hydrogen peroxide necessary for a decomposition reaction of the organic halogen compound is stoichiometrically determined, the amount of hydrogen peroxide actually preferably falls within a range of roughly from 80 to 100% of the stoichiometric amount of hydrogen peroxide necessary for complete oxidation of the organic halogen compound.

The amount of the catalyst to be used preferably falls within a range of from 1 to 10 g/L. When the amount of the catalyst is 1 g/L or less, its activity is insufficient. In addition, even when the catalyst is used in an amount of 10 g/L or more, there is no difference in the activity, and reaction operation becomes difficult.

As examples of the organic halogen compound to be treated, the following compounds may be given.

For example, the following compounds are given as an organic chlorine compound: hydrocarbon chlorides such as 1,1-dichloroethylene, dichloromethane, a trihalomethane, trans-1,2-dichloroethane, cis-1,2-dichloroethane, chloroform, 1,1,1-trichloroethane, carbon tetrachloride, 1,2-dichloroethane, trichloroethane, 1,2-dichloropropene, bromodichloromethane, cis-1,3-dichloropropene, trans-1,3-dichloropropene, 1,1,2-trichloroethylene, tetrachloroethylene, dibromodichloromethane, chlorobenzene, 1,2-dichlorobenzene, 1,3-dichlorobenzene, 1,4-dichlorobenzene, 1,2,3-trichlorobenzene, and 1,2,4-trichlorobenzene; and chlorophenol, DDT, BHC, PCB, and dioxins.

In addition, for example, the following compounds are given as an organic fluorine compound: fluorohydrocarbons including perfluorohydrocarbons, HFCs such as 1,1,1,3,3- pentafluorobutane, chlorofluorohydrocarbons such as chlorodifluoromethane and 1,1-dichloro-1-fluoroethane; fluorine-based surfactants typified by a perfluoroalkylsulfonic acid, a perfluoroalkylcarboxylic acid, and the like; and fluorine-based lubricants typified by perfluoropolyether and polytetrafluoroethylene. Both of the organic chlorine compound and the organic fluorine compound are not limited thereto.

In a Fenton method, a copper compound such as copper(I) oxide, copper(II) oxide, copper nitrate, copper chloride, or copper sulfate may be used as a catalyst other than an iron compound. However, in the present invention, copper(I) oxide and copper(II) oxide may be preferably used, and copper(I) oxide may be particularly preferably used, of those copper compounds. In addition, commercially available products may be used as those copper oxides, and hence the catalyst can be prepared dramatically simply as compared to in the related art.

It should be noted that, in the case of filling and fixing the catalyst in the reaction vessel, the catalyst is preferably used as a porous sintered body in order to maintain well contact with a reaction substrate.

In general, ozone, oxygen, hydrogen peroxide, or the like may be used as an oxidant in the hydrothermal oxidation reaction. In the present invention, hydrogen peroxide is used as an oxidant in the hydrothermal oxidation reaction in combination with copper oxide to be used as a catalyst. With this, a Fenton reaction in which a hydroxy radical (.OH) having high oxidizing power is generated can be utilized, and hence preferred results are obtained.

A mechanism in which a decomposition rate is improved in the case of using as an oxidant hydrogen peroxide is not clearly understood, but is considered to be roughly as described below.

Oxidative decomposition based on a hydrothermal oxidation method proceeds when a hydroxy radical (.OH) generated through heat decomposition (formula 1) of hydrogen peroxide as an oxidant attacks the organic halogen compound.

$$H_2O_2 + \Delta \rightarrow 2 \cdot OH \quad (1)$$

Further, in the present invention, by the use of copper oxide as a catalyst, it is considered that a Fenton reaction proceeds between copper and hydrogen peroxide, and generation of a hydroxy radical is more promoted.

The reaction is represented by the following formulae (2) and (3).

$$Cu(II) + H_2O_2 \rightarrow Cu(I) + HO_2 \cdot + H^+ \quad (2)$$

$$Cu(I) + H_2O_2 \rightarrow Cu(II) + HO^- + HO \cdot \quad (3)$$

In the hydrothermal oxidation method of the present invention, the catalytic activity is particularly high in the case of using as a catalyst copper(I) oxide, and the organic halogen compound can be decomposed at a rate of almost 100% in a short time period even when the reaction temperature is about 130° C.

The pressure in the reaction vessel only needs to be a pressure equal to or higher than the equilibrium vapor pressure of water at the reaction temperature. In particular, when the pressure is set to a pressure immediately near the equilibrium vapor pressure, the reaction vessel can be significantly simplified.

In addition, whether or not a toxic by-product was generated in the treatment was verified by TOC analysis. As a result, it was revealed that the decomposition rate of TOC reached from 80% to 90%, and large part of the decomposed organic halogen compound was mineralized to water and carbon dioxide. That is, the hydrothermal oxidation method of the present invention can suppress generation of a toxic by-product.

Further, in the case of filling and fixing the catalyst in the reaction vessel, the catalyst can maintain well contact with the reaction substrate in the reaction vessel stably for a long time period without losing its activity when the catalyst is used as a porous sintered body.

EXAMPLES

The present invention is hereinafter described in more detail by way of Examples, but the present invention is not limited to these Examples.

Figure 1:
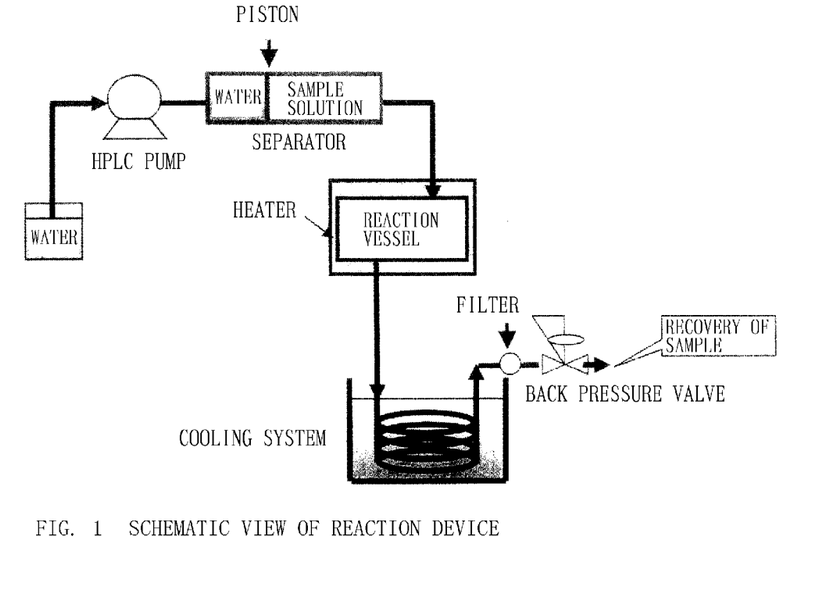
FIG. 1 is a schematic view of a device for a hydrothermal oxidation reaction.
Figure 2:
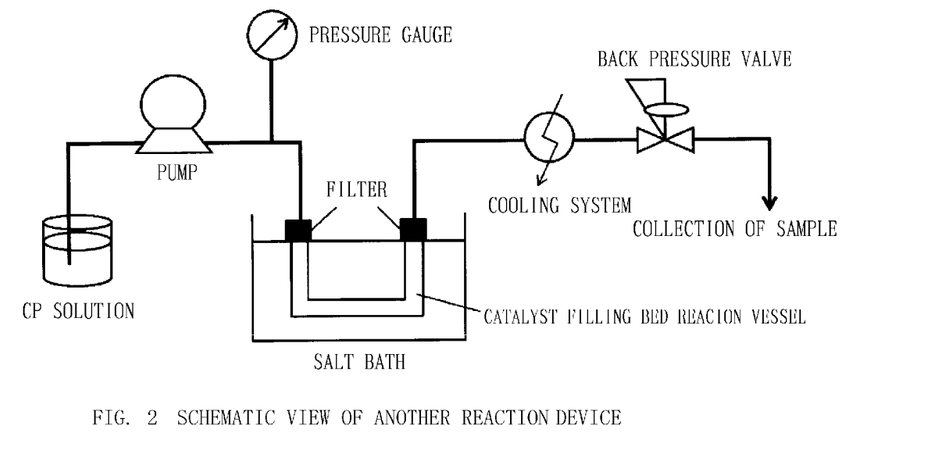
FIG. 2 is a schematic view of another device for the hydrothermal oxidation reaction.

A reaction device used in Example 1 and Comparative Examples 1 and 2 is a device illustrated in the schematic view of FIG. 1, and a reaction device used in Examples 2 to 4 is a device illustrated in the schematic view of FIG. 2.

It should be noted that an aqueous solution containing 1 mM of 4-chlorophenol (organic chlorine compound: hereinafter referred to as chlorophenol) was used as a sample in the following Examples 1 to 3.

Example 1

Catalyst

Copper(I) oxide and copper(II) oxide purchased from Kishida Chemical Co., Ltd. were directly used as a catalyst.

Decomposition of Organic Halogen Compound

Chlorophenol was used as a model substance of an organic halogen compound, and subjected to decomposition treatment based on a hydrothermal oxidation method utilizing a Fenton method.

A sample was prepared by adding 5.6 mg/L of copper(I) oxide or 3.1 mg/L of copper(II) oxide and 10 mM of hydrogen peroxide as an oxidant to 1 mM of a chlorophenol aqueous solution, and then continuously injected into a reaction vessel made of hastelloy at a pressure of 30 MPa and a flow rate of 0.5 cm³/min with a HPLC pump and a separator.

A reaction temperature was changed between room temperature and 200° C.

It should be noted that the volume in the reaction vessel is about 1 cm³, and hence a reaction time period is about 2 minutes.

The sample passed through the reaction vessel was recovered from an outlet of a pressure control valve after passing through a cooling system and a filter. In order to measure the concentration of chlorophenol in the sample after a reaction, a target substance was extracted therefrom with nitrobenzene, and then subjected to qualitative and quantitative analysis by gas chromatography (FID detector).

Figure 3:
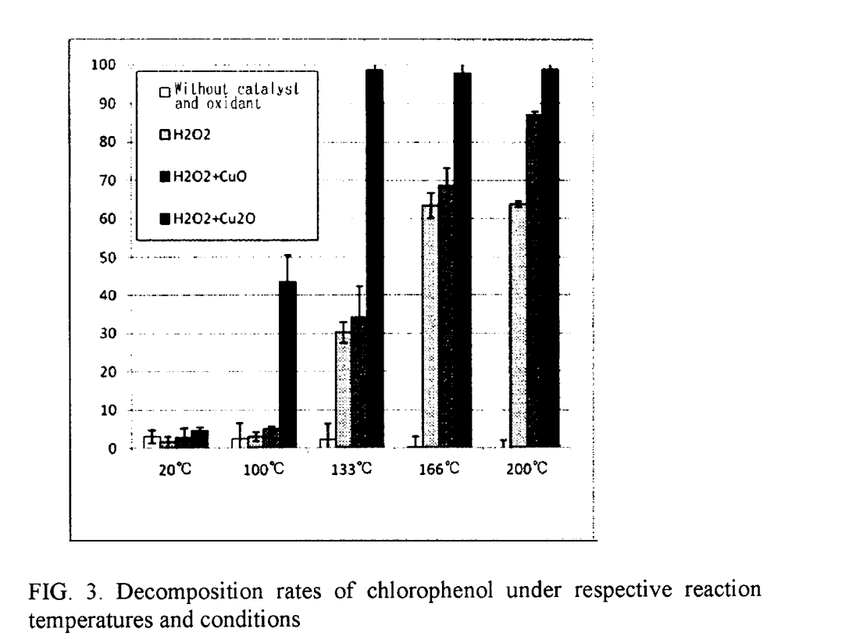
FIG. 3 illustrates the decomposition rates of chlorophenol at the respective reaction temperatures (20 to 200° C.).

FIG. 3 shows the decomposition rates of chlorophenol at the respective reaction temperatures (20 to 200° C.).

At a reaction temperature of 200° C., a decomposition rate of almost 100% was achieved in both the cases of using copper(I) oxide ($Cu_2O$) and using copper(II) oxide (CuO). In particular, copper(I) oxide ($Cu_2O$) had high activity, and was able to achieve a decomposition rate of almost 100% even when the reaction temperature was 133° C., as in the case of a reaction temperature of 166° C. or 200° C.

Comparative Examples 1 and 2

For comparison, FIG. 3 also shows the results of Comparative Example 1, in which a catalyst was not used and an oxidant was not added (without catalyst and oxidant), and Comparative Example 2, in which an oxidant was added but a catalyst was not used ($H_2O_2$).

The experimental results show that an excellent decomposition ability is exhibited in the present invention by virtue of the use of copper oxide as a catalyst in both the cases of using copper(I) oxide and using copper(II) oxide, as compared to Comparative Example 1 without a catalyst and an oxidant and Comparative Example 2 without a catalyst.

In particular, in the case of using copper(I) oxide ($Cu_2O$) as a catalyst, a decomposition rate of almost 100% was able to be achieved at a reaction temperature of 133° C., which was much lower than 200° C., for a reaction time period of 2 minutes. The reaction temperature was able to be significantly reduced.

In addition, in the present invention, copper oxide itself was used as a catalyst, and hence a catalyst preparation method was able to be dramatically simplified as compared to that in the related art and the catalyst was able to be prevented from being deteriorated through treatment for a long time period.

With this, energy saving of a process, simplification of the reaction device, and extension of the lifetime of the reaction device can be realized at higher levels.

Example 2

Chlorophenol was subjected to decomposition treatment by using a catalyst filling bed flow-type reaction device illustrated in FIG. 2. The device has a structure in which a sample solution is continuously injected into a tubular reaction vessel having filled therein a catalyst and a contaminant in the solution is subjected to decomposition treatment. The reaction vessel was a tube made of titanium (measuring 6.0 mm in outer diameter, 4.0 mm in inner diameter, and 25 cm in length) having filled therein 4 g of copper(I) oxide powder as a catalyst and having in-line filters (SS-4FWS-05, manufactured by Swagelok Co.) installed on both ends thereof.

It should be noted that the catalyst was lightly sintered at 650° C. in order to prevent the catalyst from leaking out from the reaction vessel.

In addition, the entirety of the reaction vessel was immersed in a salt bath device (TSV-3, manufactured by Toyo Koatsu Co., Ltd) in order to keep the temperature constant.

A sample solution obtained by dissolving chlorophenol (1 mM) and hydrogen peroxide (14 mM) in deionized distilled water was continuously injected into the reaction vessel with a HPLC pump. The sample solution after a reaction was discharged from a reaction system after passing through a cooling system and a back pressure valve. Chlorophenol in the sample after the reaction was extracted therefrom with nitrobenzene, and then subjected to qualitative and quantitative analysis by the same method as in Example 1. In addition, the amount of total organic carbon (TOC) in the sample was measured with a TOC measurement device (TOC-V CSH, manufactured by Shimadzu Corporation). The decomposition rate of TOC was calculated based on the expression ($TOC_0$–TOC)/$TOC_0$×100.

The "$TOC_0$" represents the amount of TOC in the sample in an unreacted state, and the "TOC" represents the amount of TOC remaining in the sample after the reaction.

Figure 4:
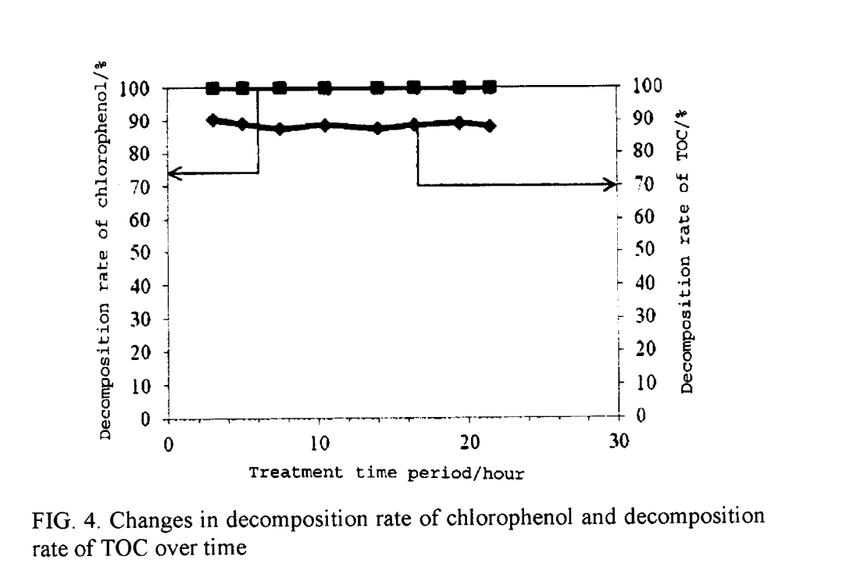
FIG. 4 illustrates changes in decomposition rate of chlorophenol and decomposition rate of TOC over time.

FIG. 4 shows changes in the decomposition rates of chlorophenol and TOC over time in the case of continuously treating the sample solution under the conditions of a reaction temperature of 200° C., a pressure of 10 MPa, and a flow rate of 1.0 cm³/min for 22 hours. The decomposition rate of chlorophenol is constant at almost 100%, and also the decomposition rate of TOC stays at around 85 to 90%. Copper(I) oxide maintained high activity even after the continuous treatment for 22 hours, and the reaction vessel made of titanium showed no abnormality. By those results, it was confirmed that the method of the present invention was very useful for industrial applications.

Example 3

In order to examine the optimal conditions of the pressure in the reaction vessel, chlorophenol was subjected to decomposition treatment under the conditions of a reaction temperature of 200° C., a pressure of 1.6 MPa, and a flow rate of 1.0 cm³/min, and of a reaction temperature of 170° C., a pressure of 0.9 MPa, and a flow rate of 1.0 cm³/min. Those reaction conditions are each located in the vicinity of the equilibrium vapor pressure curve of water on a higher pressure side.

It should be noted that a device and analysis method used were the same as those in Example 2.

Figure 5:
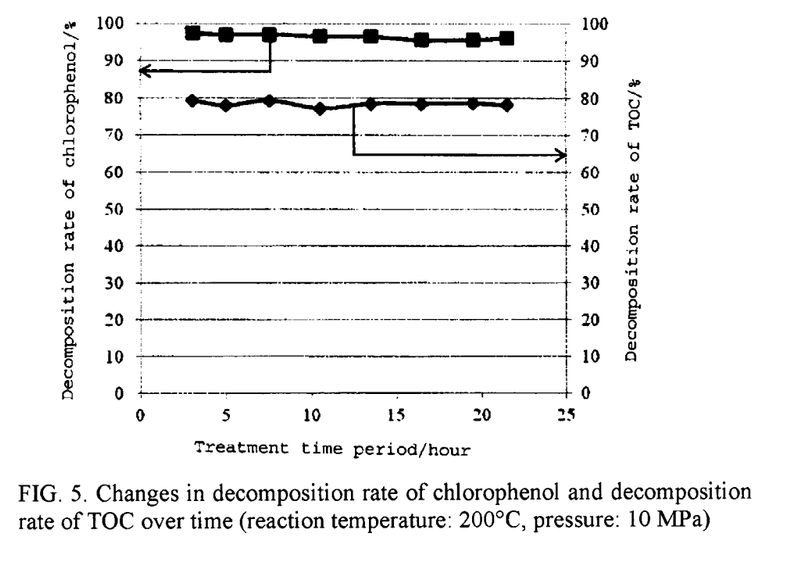
FIG. 5 illustrates changes in decomposition rate of chlorophenol and decomposition rate of TOC over time (reaction temperature: 200° C., pressure: 10 MPa).
Figure 6:
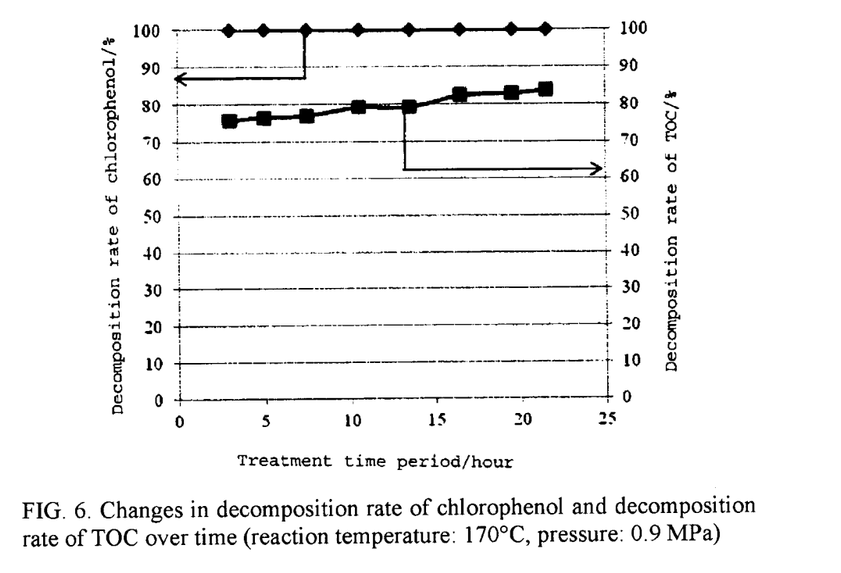
FIG. 6. Table 4. illustrates changes in decomposition rate of chlorophenol and decomposition rate of TOC over time (reaction temperature: 170° C., pressure: 0.9 MPa).

FIGS. 5 and 6 show changes in the decomposition rates of chlorophenol and TOC over time under the respective reaction conditions. In the case of a reaction temperature of 200° C. and a pressure of 1.6 MPa, the decomposition rate of chlorophenol is about 96%, and also the decomposition rate of TOC stays at around 80%. Even in the case where the reaction conditions were reduced to 170° C. and 0.9 MPa, the decomposition rate of chlorophenol reached almost 100%.

In addition, the decomposition rate of TOC was as slightly low as 75% immediately after the beginning of the treatment, but increased as the treatment time period became longer, and finally reached 83%. Those results indicate that it is enough to set the pressure in the reaction vessel to a pressure equal to or higher than the equilibrium vapor pressure at the reaction temperature.

Example 4

In order to demonstrate that the present invention can be applied to treatment of various organic halogen compounds, a sample solution obtained by dissolving trichloroethylene (3 mM) and hydrogen peroxide (10 mM) in deionized distilled water was subjected to decomposition treatment. A device and analysis method used were the same as those in Example 2.

It should be noted that the experiment was performed while the sample solution and a solution recovered after a reaction were cooled with ice in order to prevent trichloroethylene from volatilizing from the sample solution. The reaction conditions are as follows: a reaction temperature of 200° C., a pressure of 10 MPa, and a flow rate of 1.0 cm³/min.

The decomposition rate of trichloroethylene stayed at around 90 to 98%, and tended to increase as the treatment time period became longer. Those results indicated that the present invention enabled decomposition treatment of trichloroethylene.

INDUSTRIAL APPLICABILITY

The decomposition treatment method for an organic halogen compound of the present invention eliminates the need for the high temperature reaction conditions, which have conventionally been essential, and hence enables treatment at a significantly reduced reaction temperature by utilizing a Fenton reaction in treatment based on a hydrothermal oxidation method and using a newly found copper oxide catalyst in the treatment. Thus, a significant reduction in energy to be consumed in the treatment, simplification of the device, and extension of the lifetime of the device are realized.

As a result, the organic halogen compound can be efficiently subjected to hydrothermal oxidative decomposition treatment and detoxified without high facility cost or high operating cost. The decomposition treatment method of the present invention can be expected to be used in a treatment facility for waste water or a decomposition treatment facility for the organic halogen compound.

The invention claimed is:

1. A decomposition treatment method for an organic halogen compound, the method comprising heating an organic halogen compound at a temperature of from 100° C. to 200° C. in presence of a catalyst formed of copper(I) oxide ($Cu_2O$) and hydrogen peroxide, to subject the organic halogen compound to a hydrothermal oxidation reaction utilizing a Fenton method.

2. A decomposition treatment method for an organic halogen compound according to claim 1, wherein the heating of the organic halogen compound is performed at a temperature of from 120° C. to 200° C.

3. A decomposition treatment method for an organic halogen compound according to claim 1, wherein the hydrothermal oxidation reaction is performed in a reaction vessel at a pressure equal to or higher than an equilibrium vapor pressure of water at the heating temperature and near the equilibrium vapor pressure.

4. A decomposition treatment method for an organic halogen compound according to claim 1, wherein:
the catalyst formed of copper(I) oxide ($Cu_2O$) is in a form of a porous sintered body; and
the hydrothermal oxidation reaction is performed in a state in which the catalyst formed of copper(I) oxide ($Cu_2O$) is retained and fixed in the reaction vessel.

5. A decomposition treatment method for an organic halogen compound according to claim 2, wherein the hydrothermal oxidation reaction is performed in a reaction vessel at a pressure equal to or higher than an equilibrium vapor pressure of water at the heating temperature and near the equilibrium vapor pressure.

6. A decomposition treatment method for an organic halogen compound according to claim 2, wherein:
the catalyst formed of copper(I) oxide ($Cu_2O$) is in a form of a porous sintered body; and
the hydrothermal oxidation reaction is performed in a state in which the catalyst formed of copper(I) oxide ($Cu_2O$) is retained and fixed in the reaction vessel.

7. A decomposition treatment method for an organic halogen compound according to claim 2, wherein:
the catalyst formed of copper(I) oxide ($Cu_2O$) is in a form of a porous sintered body; and
the hydrothermal oxidation reaction is performed in a state in which the catalyst formed of copper(I) oxide ($Cu_2O$) is retained and fixed in the reaction vessel.

* * * * *